(12) United States Patent
Raaz et al.

(10) Patent No.: US 11,661,284 B2
(45) Date of Patent: May 30, 2023

(54) CARRIER ROLLERS FOR CONVEYOR BELT SYSTEMS

(71) Applicants: thyssenkrupp Industrial Solutions AG, Essen (DE); thyssenkrupp AG, Essen (DE)

(72) Inventors: Viktor Raaz, Bochum (DE); Martin Schmitt, Witten (DE); Bastian Hofmann, Bochum (DE); Gerhard Michaeli, Sankt Ingbert (DE); Rüdiger Eichler, St. Ingbert (DE)

(73) Assignee: FLSMIDTH A/S

( * ) Notice: Subject to any disclaimer, the term of this patent is extended or adjusted under 35 U.S.C. 154(b) by 0 days.

(21) Appl. No.: 17/617,903

(22) PCT Filed: Jun. 9, 2020

(86) PCT No.: PCT/EP2020/065889
§ 371 (c)(1),
(2) Date: Dec. 9, 2021

(87) PCT Pub. No.: WO2020/249531
PCT Pub. Date: Dec. 17, 2020

(65) Prior Publication Data
US 2022/0306392 A1    Sep. 29, 2022

(30) Foreign Application Priority Data
Jun. 12, 2019   (DE) .................... 10 2019 208 488.5

(51) Int. Cl.
*B65G 15/60*   (2006.01)
*B65G 15/08*   (2006.01)
(Continued)

(52) U.S. Cl.
CPC ............. *B65G 15/60* (2013.01); *B65G 15/08* (2013.01); *B65G 39/071* (2013.01); *B65G 39/12* (2013.01)

(58) Field of Classification Search
CPC ...... B65G 15/60; B65G 15/08; B65G 39/071; B65G 39/12; B65G 39/02; B65G 39/125; B65G 39/14; B65G 39/145; B65G 39/01
(Continued)

(56) References Cited

U.S. PATENT DOCUMENTS

| | | |
|---|---|---|
| 2,665,592 A | 1/1954 | Lorig |
| 3,001,682 A | 9/1961 | Carroll et al. |

(Continued)

FOREIGN PATENT DOCUMENTS

| | | |
|---|---|---|
| DE | 10 2011 052 697 A1 | 2/2013 |
| DE | 10 2014 002 360 A1 | 8/2015 |

(Continued)

OTHER PUBLICATIONS

English Translation of International Search Report issued in PCT/EP2020/065889, dated Sep. 9, 2020.
(Continued)

*Primary Examiner* — Mark A Deuble
(74) *Attorney, Agent, or Firm* — Jeffrey A. Sharp

(57) ABSTRACT

A carrier roller for a conveyor belt may be configured to be rotatable about an axis of rotation and may include a roll element with a rolling support region that is configured to provide rolling support for the conveyor belt. The rolling support region is rotationally symmetrical with respect to the axis of rotation of the carrier roller and has different diameters along its axial extension, including a maximum diameter and a minimum diameter. The minimum diameter of the rolling support region is at least 95% and at most 99.8% of the maximum diameter of the rolling support region. Carrier
(Continued)

roller stations and belt conveyor systems may employ such carrier rollers.

19 Claims, 3 Drawing Sheets

(51) Int. Cl.
*B65G 39/071* (2006.01)
*B65G 39/12* (2006.01)

(58) Field of Classification Search
USPC .................................. 198/806, 819
See application file for complete search history.

(56) References Cited

U.S. PATENT DOCUMENTS

| | | | | |
|---|---|---|---|---|
| 3,211,278 A * | 10/1965 | Arndt | ............. | B65G 39/06 |
| | | | | 198/843 |
| 5,042,646 A | 8/1991 | Beatty | | |
| 6,029,800 A | 2/2000 | Kratz et al. | | |
| 6,241,078 B1 * | 6/2001 | Mott | ............. | B65G 39/16 |
| | | | | 198/806 |
| 7,870,949 B2 * | 1/2011 | Kanaris | ............. | B65G 39/02 |
| | | | | 193/35 R |
| 8,240,463 B2 * | 8/2012 | Graber | ............. | B65G 15/40 |
| | | | | 198/819 |
| 8,844,710 B2 * | 9/2014 | Enshu | ............. | B65G 15/08 |
| | | | | 198/819 |
| 9,010,526 B2 | 4/2015 | Raaz | | |
| 9,278,811 B2 | 3/2016 | Heitplatz et al. | | |
| 11,097,900 B2 * | 8/2021 | Turco | ............. | B65G 39/071 |
| 2014/0183008 A1 * | 7/2014 | Yasumoto | ............. | B41J 11/007 |
| | | | | 198/813 |
| 2016/0176645 A1 | 6/2016 | Axmann | | |
| 2016/0200473 A1 | 7/2016 | Nitta | | |

FOREIGN PATENT DOCUMENTS

| | | | |
|---|---|---|---|
| DE | 10 2014 119 043 A1 | 6/2016 | |
| EP | 0 058 040 A1 | 8/1982 | |
| EP | 2251280 A1 * | 11/2010 | ............... A23N 7/04 |
| GB | 785 680 A | 10/1957 | |
| GB | 2185726 A * | 7/1987 | ......... B32B 38/1866 |

OTHER PUBLICATIONS

DIN 15207, Continous Mechanical Handling Equipment, 10 pages, 1988.
DIN 22112 (part 1—2000, part 2—1996 and part 3—1989), Belt Conveyors for Underground Coal Mining, 20 pages.
VDI 2341 standard, Belt Conveyors for Bulk Material, 24 pages, 2007.

* cited by examiner

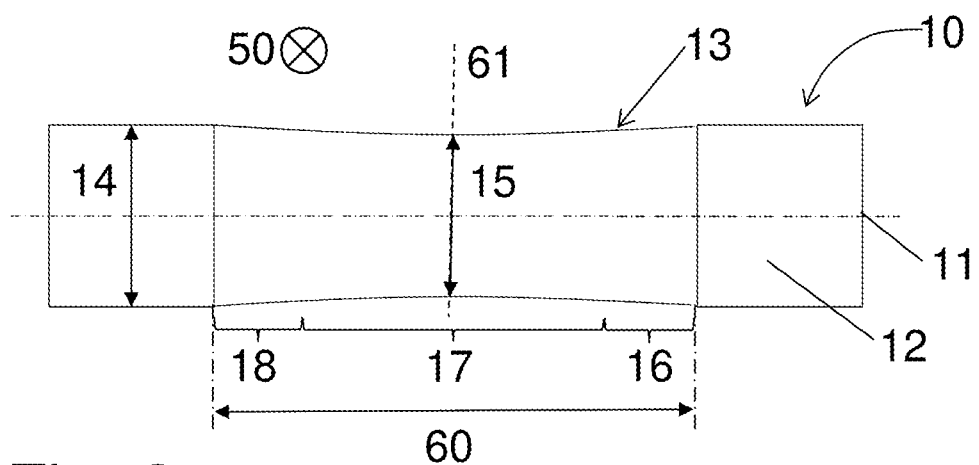
Fig. 2
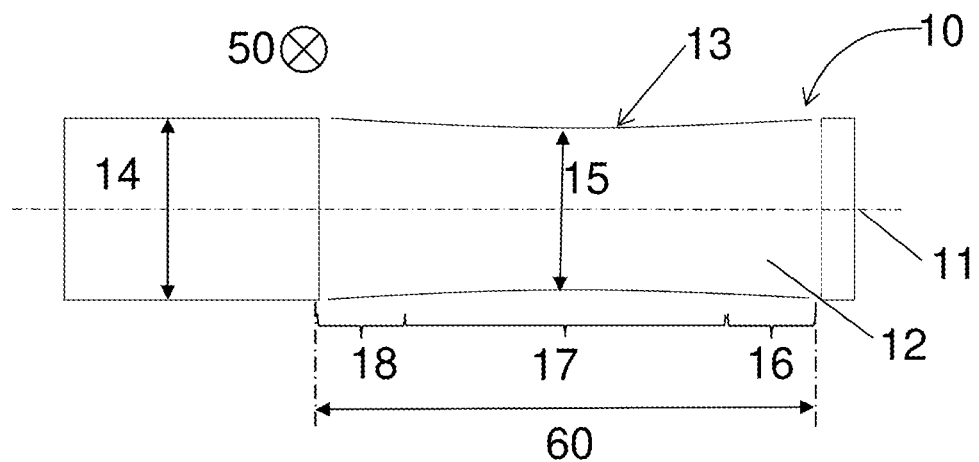
Fig. 3.1
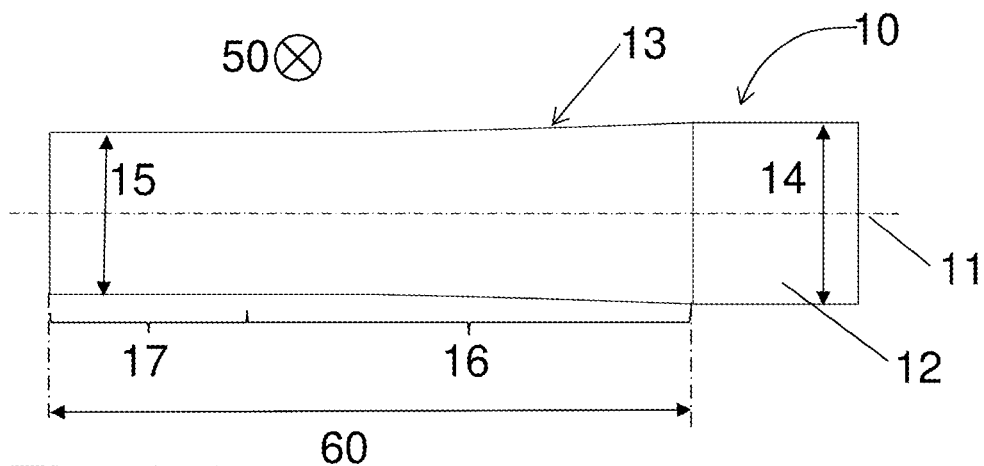
Fig. 3.2

CARRIER ROLLERS FOR CONVEYOR BELT SYSTEMS

CROSS REFERENCE TO RELATED APPLICATIONS

This application is a U.S. National Stage Entry of International Patent Application Serial Number PCT/EP2020/065889, filed Jun. 9, 2020, which claims priority to German Patent Application No. DE 10 2019 208 488.5, filed Jun. 12, 2019, the entire contents of both of which are incorporated herein by reference.

FIELD

The present disclosure generally relates to conveyor belts, including carrier rollers for conveyor belts and methods for supporting and guiding conveyor belts.

BACKGROUND

For the transport of bulk materials such as slag, ores, fuels, building materials and the like over a specified conveying path (transport path), belt conveyor systems (belt conveyors, conveyor belt systems, band conveyor systems, belt band conveyor systems) are commonly used as static or semi-static continuous conveyors. In a belt conveyor system, an endless conveyor belt (carrier belt, conveyor band) is caused to perform a circulating movement by at least one drive station (drive drum). Here, the conveyor belt is guided as an upper strand from one (a start-side) diverting station to a further (an end-side) diverting station, at which the conveyor belt is diverted. From the end-side diverting station, the diverted conveyor belt is returned as a lower strand to the start-side diverting station, is diverted again there, and is guided as an upper strand again. As drums for diverting stations of conveyor belts, US 2016/176645 A1 has disclosed friction rollers which are for example of spindle-like convex configuration, in order to prevent lateral slippage of the conveyor belt on the friction roll during operation, or else are of frustoconical configuration, in order to improve the running of the conveyor belt around curves.

For bulk materials, use is seldom made of conveyor belts in flat form (in a flat-belt conveyor system), with use rather being made in particular of conveyor belts with a troughed upper strand (as a troughed belt in a troughed-belt conveyor system, for example with a V-shaped trough in the case of two carrier rollers or with a U-shape for example in the case of three, four, five or more carrier rollers), or with a rolled upper strand (as a hose belt/tube belt, in each case in a hose belt conveyor system), owing to the greater carrying capacity and better material guidance. Depending on the conveying task, a conveyor belt guided in a troughed or rolled upper strand is returned in the lower strand in a flat form, in a troughed form or, in individual applications, also in a rolled form.

The endlessly circulating conveyor belt must, over the conveying path, be supported and guided in the laden upper strand and in the returned lower strand (in the unladen or else laden state in said lower strand), wherein support is particularly important for a laden conveyor belt. As carrier elements and guide elements for support and guidance, use is made of carrier rollers in a carrier frame structure, a carrier roller station. At least one carrier roller is rotatably mounted and supported in a carrier roller station, with multiple carrier rollers commonly being provided—in particular in the case of carrier roller stations for troughed or rolled conveyor belts; carrier roller stations for troughed or rolled conveyor belts with waisted carrier rollers are known for example from EP 0 058 040 A1. Carrier roller stations thus constitute support points for the conveyor belt and are typically configured as a rigid frame structure (carrier roller seat, roller seat, roller bracket), in which the axles of the individual carrier rollers are rigidly arranged, or else as a movable structure (carrier roller garland), in which the axles of the individual carrier rollers are arranged so as to be movable relative to one another, by virtue of these being connected to one another by means of chains, for example. Carrier roller stations may be individually positionable along the conveying path, connectable to adjacent carrier roller stations in the context of a superordinate frame structure, or else be formed as an integral constituent part of the carrier frame of the belt conveyor system.

The conveyor belt of a belt conveyor system typically has an upper outer sheet and a lower outer sheet, between which there is arranged a load-bearing element (carcass) designed as an inlay. Said carcass is composed of a fiber layer or multiple fiber layers that are embedded in rubber. The fiber layer serves primarily as a longitudinal member (tensile member, belt tensile member, longitudinal cording). For this purpose, fibers are arranged so as to be oriented in a longitudinal direction of the conveyor belt and, during operation, the tensile forces acting in a conveying direction (in a transport direction, that is to say movement direction of the conveyor belt and thus in the longitudinal direction thereof) are transmitted or dissipated via said fibers. In general, the longitudinal members are textile fabrics, steel cables, high-strength polymers or corresponding composite systems. As transverse reinforcement, it is common for additional strength members to be provided which are arranged so as to be oriented transversely with respect to the longitudinal direction and which reinforce the conveyor belt transversely with respect to the conveying direction. In general, these additional strength members are steel cables or textile fabrics. The upper outer sheet and the lower outer sheet of the conveyor belt are rubber layers, wherein the upper outer sheet (load-bearing layer, load-bearing side) serves for accommodating the bulk material, and the lower outer sheet (running layer, running side) is in contact with the diverting rolls, drive rolls, carrier rollers and other guide and support elements. Owing to the direct contact of the upper outer sheet with the—in some cases sharp-edged—material for conveying, the upper outer sheet is generally of wear-resistant form and has a greater thickness than the lower outer sheet. The thickness of the carrier-roller-side lower outer sheet is, in many conveyor belts, in the range from 3 mm to 5 mm.

The carrier rollers support the conveyor belt over the conveying path at a multiplicity of support points, wherein the conveyor belt runs in unsupported fashion in the region between two adjacent support points. Belt sag therefore occurs in this region in the longitudinal direction of the conveyor belt. As a result, at the carrier rollers, at the point at which the underside—that is to say the outer side of the lower outer sheet—of the conveyor belt comes into contact with the outer side of the carrier roller (in the contact zone), the conveyor belt is subject to a local curvature perpendicular to the conveyor belt surface in the longitudinal direction of the conveyor belt, the extent of which local curvature is dependent on the belt sag and thus also on the loading state of the conveyor belt. The curvature of the conveyor belt refers generally to the local deviation from a straight course of the conveyor belt, wherein such a curvature occurs in this case perpendicularly with respect to the conveyor belt surface (the upper outer side of the upper outer sheet or the lower outer side of the lower outer sheet) and perpendicularly with respect to the conveying direction and thus perpendicularly with respect to the tensile forces. In the case of a longitudinal curvature (longitudinal member curvature), the outer circumference of the curvature circle coincides with the conveyor belt in the conveying direction, such that said curvature is correspondingly also transmitted to the longitudinal members, and in the case of a transverse curvature, the outer circumference of the curvature circle coincides with the conveyor belt transversely with respect to the conveying direction.

For the transport of the material for conveying by means of a belt conveyor system, a certain amount of energy is required, which, aside from the transport energy (that is required for actually transporting the material for conveying), also includes components that are attributable to a running resistance between conveyor belt and carrier rollers. This running resistance is based inter alia on friction phenomena between conveyor belt and carrier rollers. The running resistance not only leads to relatively high energy consumption, which is undesired for economic and ecological reasons, but furthermore also results in greater mechanical loading of the lower outer sheet of the conveyor belt. During transport, this mechanical loading gives rise to increased abrasion and increased wear of the lower outer sheet, and moreover to noise pollution (squealing).

Thus, a need exists to reduce the running resistance in the transport of material for conveying on a belt conveyor system. In particular, a need exists to provide a carrier roller for a troughed or rolled conveyor belt, which carrier roller offers reduced running resistance, and to provide a carrier roller holder for such a carrier roller, a belt conveyor system having such a carrier roller, and a method for supporting and guiding a troughed or rolled moving conveyor belt, which has a transverse curvature transversely with respect to the movement direction.

BRIEF DESCRIPTION OF THE FIGURES

FIG. 2 is a front view of an example carrier roller.

FIG. 3.1 is a front view of another example carrier roller.

FIG. 3.2 is a front view of a carrier roller according to a configuration not covered by the present disclosure.

DETAILED DESCRIPTION

Figure 1:
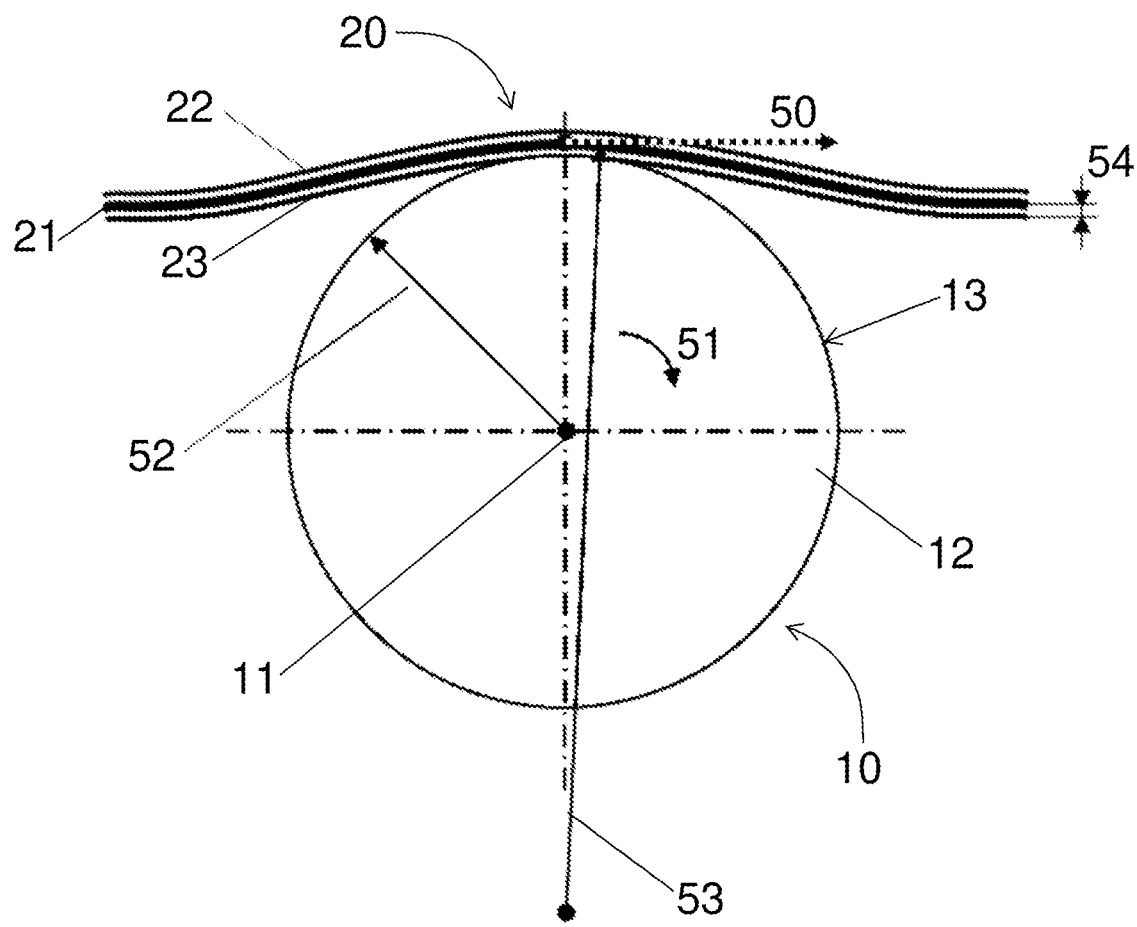
FIG. 1 is a side view of an example carrier roller with a conveyor belt.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a carrier roller for a troughed conveyor belt or a rolled conveyor belt, wherein the carrier roller is designed to be rotatable about an axis of rotation and comprises a roll element with a rolling support region that is configured to provide rolling support for the conveyor belt, wherein the rolling support region is rotationally symmetrical with respect to the axis of rotation of the carrier roller and has different diameters along its axial extension, with a maximum diameter of the rolling support region and a minimum diameter of the rolling support region. The invention furthermore relates to a carrier roller station having at least one such carrier roller, to a belt conveyor system having at least one such carrier roller station, and to a method for supporting and guiding a troughed or rolled moving conveyor belt that has a transverse curvature transversely with respect to the movement direction.

In some examples, a carrier roller for a troughed or rolled conveyor belt, may be designed to be rotatable about an axis of rotation and comprises a roll element with a rolling support region that is configured to provide rolling support for the conveyor belt, wherein the rolling support region is rotationally symmetrical with respect to the axis of rotation of the carrier roller and has different diameters along its axial extension, with a maximum diameter of the rolling support region and a minimum diameter of the rolling support region. In the case of the carrier roller, the minimum diameter of the rolling support region is at least 95% and at most 99.8% of the maximum diameter of the rolling support region. The roll element comprises a first roll region and a second roll region, of which the first roll region is arranged at one end of the roll element and of which the second roll region is arranged adjacent to the first roll region. Here, the rolling support region has the maximum diameter at least in a part of the first roll region, and the rolling support region has the minimum diameter at least in a part of the second roll region. The roll element furthermore has a third roll region which is arranged at a further end of the roll element, wherein the further end is arranged opposite the end of the roll element with the first roll region, such that the second roll region is arranged in an axial direction between the first roll region and the third roll region, wherein the rolling support region has the maximum diameter at least in a part of the third roll region.

The present invention basically relates to the belt conveyor systems described in general terms in the introduction and to the individual components thereof. Here, carrier rollers (support rollers, idlers) are functional elements which, in a rotational movement about their axis of rotation (rotation axis), allow rolling contact between a moving conveyor belt and a static or quasi-static carrier frame. The conveyor belt is an endless band which, with regard to construction and material, is designed to be able to serve as a load-bearing means for the material to be transported (material for conveying), and at the same time said conveyor belt also serves as a traction mechanism for a movement in a conveying direction. As already described, a conveyor belt typically has a lower outer sheet (lower cover plate) and an upper outer sheet (upper cover plate) and a region arranged as an inlay between the two outer sheets. Said region comprises the longitudinal members and possibly also transverse members. Furthermore, a conveyor belt may self-evidently also have further elements, for example an edge protector; this is generally manufactured from rubber. A conveyor belt may basically be of any desired design, either manufactured directly in an endless structural form or else as a band, the ends of which have been connected to one another by means of an endless connection (for example in the form of a mechanical connection or in the form of a vulcanized connection). Here, the carrier frame is the frame-like carrier structure of a belt conveyor system, by means of which the belt conveyor system is supported on the ground. Typically, the main elements of a carrier frame are formed from steel structural profiles.

A carrier roller is consequently designed to be rotatable about an axis of rotation. For this purpose, the carrier roller has a roll element (roll body, carrier roller shell, roller) that is mounted rotatably on a carrier axle as axis of rotation. The outer surface (lateral surface) of the roll element forms, on the outer circumference of the roll element in a radial direction, a rolling support region (rolling surface region); this is a partial region of the lateral surface of the roll element or possibly also the entire lateral surface of the roll element. The lateral surface of the roll element forms a rotationally symmetrical three-dimensional arrangement of a two-dimensional surface, such that the rolling support region, also as a partial region of this surface, likewise constitutes a three-dimensional curved arrangement of a two-dimensional (partial) surface, the diameter of which arrangement lies transversely with respect to the axis of rotation.

Said partial region is arranged on the roll element so as to constitute the outer delimitation of the roll element in a radial direction, such that, as the roll element rolls on a surface, said region makes contact in each case locally with said surface. During operation, it is therefore also the case that the rolling support region makes contact with the lower outer sheet of the conveyor belt as running surface, such that the conveyor belt is provided with rolling support during the rolling movement of the carrier roller. For this purpose, during operation, the axes of rotation of the carrier rollers are arranged transversely with respect to the conveying direction of the conveyor belt, and the carrier rollers are therefore at least substantially perpendicular to the conveying direction (that is to say at an angle of 90° (degrees) with respect thereto or at most with a deviation from this angle that still ensures a movement of the conveyor belt in the conveying direction substantially without rolling resistance, for example with a deviation of at most ±3° from 90°).

In order to ensure uniform rolling behavior, carrier rollers are designed to be rotationally symmetrical with respect to the axis of rotation, which runs through the carrier roller within the carrier roller. Here, in particular, the rolling support region is rotationally symmetrical with respect to the axis of rotation of the carrier roller. In the context of this application, a body is considered to be "rotationally symmetrical" when it has at least substantial rotational symmetry (rotation symmetry) about an axis of rotation; this does not rule out that a rotationally symmetrical body may possibly have relatively small manufacturing-induced or otherwise intended or unintended irregularities, for example bores, which deviate from ideal (perfect) rotational symmetry. Roll elements generally have a cylinder shape or cylinder-like shapes. A cylinder-like shape is in particular also regarded as including deviations from the cylinder shape, in the case of which the cylinder shape is regionally modified without this resulting in a departure from rotational symmetry, for example a single or multiple, symmetrical or asymmetrical waisted formation(s) of the roll element (also spindle-like) or else a configuration as a frustum.

Roll elements are generally manufactured from a material which can be subjected to mechanical load and which is thus stable, typically from steel or high-grade steel, from aluminum, from polymer materials, ceramic materials or from composite materials. Roll elements are commonly formed as tubular sections, into the ends of which, as carrier roller bases, there are welded or pressed caps (often cast caps) which have—normally integrated—bearing holders. It is typically then the case here that an internal bearing arrangement is used, in the case of which rolling bearings, for example deep-groove ball bearings, are introduced into the bearing holders, which rolling bearings are situated within the carrier roller and by means of which rolling bearings an internally situated fixed axle (carrier axle) is rotatably guided, which axle is connected to the carrier frame such that the carrier roller then rotates relative to the fixed axle. The bearings are commonly sealed off by suitable sealing means, for example with labyrinth seals. In addition to the elements stated above, carrier rollers may have further elements, for example buffer rings or buffer coatings composed of elastically compressible materials, or support rings.

The dimensions of the carrier rollers are dependent on the width of the respectively used conveyor belt and on the speed to be achieved. Depending on the intended use, carrier roller diameters are typically selected from a range from 60 mm to 220 mm, though other diameters are also possible. Common designs of standardized carrier rollers are specified for example in DIN 15207 and DIN 22112, parts 1 to 3, and in the VDI 2341 standard.

The running resistance of a carrier roller is determined primarily by the internal friction of the bearings and of the sealing means (in particular owing to manufacturing tolerances of the individual components and owing to the wear of the carrier rollers) and by the viscosity of the lubricant for the bearings. A large number of secondary factors, which are difficult to quantify, likewise also contribute to the running resistance.

According to the present invention, the rolling support region has different diameters along its axial extension, that is to say the rolling support region does not have a constant diameter over its entire extension, and is consequently also not exactly cylindrical in form, but rather is at most cylinder-like. The expression "axial" is to be understood in the present case as "oriented along the axis of rotation of the carrier roller" (oriented parallel to the axis of rotation of the carrier roller), wherein the axis of rotation of the carrier roller also forms the axis of rotation of the roll element and simultaneously also constitutes the axis of rotation of the rolling support region, which is rotationally symmetrical with respect to the axis of rotation of the carrier roller. Similarly, the expression "radial" is to be understood in the present case as "oriented perpendicular to the axis of rotation of the carrier roller".

Here, the rolling support region has a maximum diameter. This means that the rolling support region has, at at least one position or in at least one partial region, a diameter that is not exceeded by any other diameter of the rolling support region. This however does not rule out that the rolling support region has this maximum diameter at multiple positions, over a partial region, or even over multiple partial regions. Likewise, the rolling support region has, at at least one position or over at least one partial region, a minimum diameter, which is not undershot by any other diameter of the rolling support region. Typically, the transition from a position/point of maximum diameter to a point of minimum diameter in an axial direction is continuous, and thus step-free, with respect to the diameter, though variants with a stepped transition or with multiple stepped transitions are basically also possible, for example in the case of segmented carrier rollers.

The fact that the rolling support region has a maximum diameter does not rule out that the roll element or the carrier roller as a whole may, in regions other than the rolling support region, have a diameter that exceeds the maximum diameter of the rolling support region. Rather, such a larger diameter may be situated for example in a partial region of the roll element which, as the roll element rolls on a surface of the conveyor belt, locally does not make contact with the surface of the conveyor belt and thus does not form part of the rolling support region. This also includes, for example, elevations at the end sections of the carrier roller, which elevations project beyond the rolling support region. A corresponding situation also applies to the minimum diameter, which may be undershot by parts of the carrier roller that do not belong to the rolling support region, that is to say for example relatively deep indentations in the upper side of the roll element that do not come into contact with the outer side of the conveyor belt; these may for example be the gaps between individual roll segments or else grooves for reducing the friction area.

According to the invention, the minimum diameter of the rolling support region is at least 95% of the maximum diameter of the rolling support region and at most 99.8% of the maximum diameter of the rolling support region.

In other words, the present invention thus also encompasses a carrier roller for a conveyor belt, which carrier roller comprises a roll element with a lateral surface, wherein, with regard to the lateral surface, the roll element has a largest diameter of the roll element, with respect to the lateral surface, as maximum diameter and a smallest diameter of the roll element, with respect to the lateral surface, as minimum diameter, wherein the minimum diameter of the roll element is at least 95% and at most 98.8% of the maximum diameter of the roll element. Here, with regard to the lateral surface of the roll element, the diameter of the roll element corresponds to the diameter of the rolling support region, such that the largest diameter (with respect to the lateral surface) of the roll element thus constitutes the maximum diameter of the rolling support region and the smallest diameter (with respect to the lateral surface) of the roll element constitutes the minimum diameter of the rolling support region.

According to a further aspect, the carrier roller is configured such that the minimum diameter of the rolling support region is at least 98.0% of the maximum diameter of the rolling support region. According to a further aspect, the carrier roller is configured such that the minimum diameter of the rolling support region is at least 99.0% of the maximum diameter of the rolling support region. This results in carrier rollers which can be used for a wide variety of different conveying tasks and which at the same time have only small deviations in shape with respect to conventional cylindrical roll bodies and can thus be easily produced from the latter.

According to a further aspect, the carrier roller is configured such that the minimum diameter of the rolling support region is at most 99.75% of the maximum diameter of the rolling support region. According to a further aspect, the carrier roller is configured such that the minimum diameter of the rolling support region is at most 99.5% of the maximum diameter of the rolling support region. This results in carrier rollers which can be used for a wide variety of different conveying tasks and which at the same time require only small adaptation measures in relation to conventional cylindrical roll bodies.

Thus, the present invention therefore comprises carrier rollers in the case of which the minimum diameter of the rolling support region lies in a range from 95.0% to 99.8%, in particular in ranges from 98.0% to 99.8%, from 99.0% to 99.8%, from 95.0% to 99.75%, from 98.0% to 99.75%, from 99.0% to 99.75%, from 95.0% to 99.5%, from 98.0% to 99.5% or even only from 99.0% to 99.5%.

According to a further aspect, the carrier roller is configured such that the rolling support region at least partially has a friction-reducing coating, in particular a coating with a polymer or a lacquer. Basically all coating materials that reduce the friction between the surface of the conveyor belt, on the one hand, and the surface of the carrier roller, specifically the rolling support region of the roll element, on the other hand, in particular during the movement of the conveyor belt over the carrier rollers, during operation may be used as materials for such a coating. Such coatings are coordinated with the material respectively used for the surface of the conveyor belt, wherein use is generally made of materials that exhibit significantly lower sliding friction on the respective belt surface than the non-coated roll element, which is typically manufactured from a steel. Additionally, the coatings may offer further functionalities, for example abrasion resistance or corrosion resistance of the carrier roller, or may improve the electrostatic characteristics of the conveyor belt-carrier roller combination, wherein it is also possible for separate coatings to be provided for such purposes.

The invention is based on findings recently obtained in measurements of the path velocity of the lateral surface of carrier rollers: in these tests, it was surprisingly found that the surface speeds on the lateral surface of conventional (cylindrical) carrier rollers are lower than the corresponding conveyor belt speeds. For example, for tubular belt conveyors, the speed difference may be 1% or even more depending on the loading state of the conveyor belt, which should inevitably lead to sliding friction and/or to energy losses at the edges of the support regions between carrier roller and conveyor belt.

If the (usually troughed) conveyor belt is supported by a carrier roller whose axis of rotation is arranged transversely with respect to the conveying direction, then a local conveyor belt depression forms at this point in the conveyor belt (in the longitudinal direction), wherein, the higher the belt loading and the lower the belt tensile force, the more pronounced the depression. This local deformation of the conveyor belt in the support region of the carrier roller results in a local curvature of the longitudinal members of the conveyor belt perpendicularly with respect to the conveyor belt surface in the longitudinal direction of the conveyor belt (longitudinal member curvature; longitudinal curvature). The degree of the longitudinal member curvature is evidently dependent here primarily on the construction of the conveyor belt, on the belt roll-up radius (trough formation), on the loading of the conveyor belt, on the belt tensile force, on the carrier roller arrangement and on the carrier roller distance. It has been found here that, in the contact zone in which the lower side of the conveyor belt makes contact with the upper side of the carrier roller, it is then the case that, the more pronounced the local curvature of the longitudinal members of the conveyor belt in the longitudinal direction (thus for example in the case of greater belt loading), the lower the surface speeds of the running layer of the conveyor belt. Conversely, it is also the case that, the less pronounced the longitudinal curvature of the longitudinal members of the conveyor belt, the higher the surface speeds of the running layer. When no curvature arises, then the surface speed of the running layer of the conveyor belt (and thus also the surface speed on the lateral surface of the cylindrical carrier rollers) is at a maximum and is then identical to the conveyor belt speed.

As has now been observed, the curvature of the longitudinal members is not identical over the entire width of the conveyor belt (that is to say transversely with respect to the conveying direction), but the conveyor belt rather has curvatures of different degrees over its width. This has the effect that the surface speeds of the running layer of the conveyor belt likewise vary over the support region width of the carrier roller, such that the conveyor belt thus runs onto the carrier roll in the contact zone with surface speeds that vary slightly over its width.

The carrier roller has no dedicated drive, such that the carrier roller rotational speed results from the speed with which the conveyor belt is guided over the carrier roller in the contact zone—and additionally from the radius of the carrier roller, from the degree of the local curvature of the longitudinal member over the rolling support region, and from the distance between the outer side of the lower outer sheet and the axial center of the longitudinal members, which in the case of steel-cable belts may for example be 10 mm and greater. Over the width of the support region (that is to say along or parallel to the carrier roller axis), the longitudinal member curvature is not constant; in general, this reaches its maximum value in the center of the support region and its minimum value at the edge of the support region. The run-on speed of the lower outer sheet of the conveyor belt in the support region thus also varies over the width of the support region. The speed of the lower outer sheet of the conveyor belt is lower in the center of the support region than at the edge of the support region, wherein the speed difference may generally range from fractions of one percent to a few percent.

Since a carrier roller with a single-piece roll element can assume only a single rotational speed in each case, the varying run-on speeds of the running layer of the conveyor belt onto the lateral surface of the cylindrical carrier roller have the effect that opposing shear stresses form in the contact zone, which can lead to deformations of the lower outer sheet, in particular to local sliding of the conveyor belt on the lateral surface of the carrier roller in the region of the contact zone. The deformation, and also the local sliding phenomena, are associated with irreversible energy losses, which contribute to the running resistance. These are difficult to quantify. Based on the present tests, for a difference between the conveyor belt speed and the surface speed of the carrier roller in the range from 0.2% to 1.0%, the slip loss is estimated as being approximately 0.1% to 0.5% of the product of carrier roller support force and belt speed, for which an increase in the overall running resistance by 5% to 20% is to be expected.

In order to reduce the energy losses in the contact zone between the carrier roller and the conveyor belt owing to the different curvatures of the tension strands over the width of the conveyor belt, a profiling of the carrier roller in the region of the contact zone is provided. For this purpose, the carrier roller is designed such that, in the contact region with respect to the conveyor belt, the circumferential speed of the carrier roller is at least approximately equal to the surface speed of the lower outer sheet of the conveyor belt (belt surface speed), wherein the tensile member curvatures that vary over the width of the conveyor belt in the contact zone are taken into consideration. This is achieved according to the invention in that the diameter of the lateral surface of the roll element is not constant over the width of the conveyor belt in the region of the contact zone. Rather, the rolling support region has varying diameters of the lateral surface of the roll element, wherein the diameter of the lateral surface is greater where the conveyor belt is subjected to more intense longitudinal loading, and thus a more pronounced longitudinal curvature of the tensile members, during operation. Here, the diameter is selected such that, over the entire width of the conveyor belt, the circumferential speed of the carrier roller is, in every longitudinal position of the contact zone, equal to the surface speed of the lower outer sheet of the conveyor belt.

As the tests have shown, in the case of carrier rollers for existing belt conveyor systems, in most cases a reduction of the diameter of the rolling support region of the roll element by at most 0.2% to 2.0% is sufficient to ensure that the circumferential speed of the carrier roller is, over the width of the conveyor belt, equal to the surface speed of the lower outer sheet of the conveyor belt; a greater reduction is necessary only in a few configurations (for example in the case of overladen conveyor belts or during the conveying of extra-heavy loads).

According to the present disclosure, the above carrier roller is configured such that the roll element comprises a first roll region and a second roll region, of which the first roll region is arranged at one end of the roll element and of which the second roll region is arranged adjacent to the first roll region, wherein the rolling support region has the maximum diameter at least in a part of the first roll region, and wherein the rolling support region has the minimum diameter at least in a part of the second roll region. Here, the roll regions constitute subregions of the roll element that are arranged in an axial sequence. The first roll region is commonly situated at or in the vicinity of one end of the roll element, and is therefore adjacent to one of the carrier roller bases of the carrier roller roll. The second roll region is then arranged adjacent to the first roll region, resulting in the sequence "first carrier roller base—first roll region—second roll region" in the axial direction for this part of the roll element. Adjacent to the second roll region, there is then arranged a further roll region.

The rolling support region has the maximum diameter at least in a part (partial region) of the first roll region, and the rolling support region has the minimum diameter at least in a part (partial region) of the second roll region. This means that, within the first roll region, the rolling support region either has a constant diameter, specifically the maximum diameter, or that the rolling support region has the maximum diameter at one position or at multiple positions. At the other positions of the first roll region, the rolling support region then has diameters that, although smaller than the maximum diameter, are nevertheless greater than or equal to the minimum diameter. At the same time, within the second roll region, the rolling support region either has a constant diameter, specifically the minimum diameter, or the rolling support region has the minimum diameter at one position or at multiple positions, wherein, at the other positions of the second roll region, the rolling support region then has diameters that, although greater than the minimum diameter, are at the same time less than or equal to the maximum diameter.

In other words, the present invention thus also relates to a carrier roller for a conveyor belt, the carrier roller comprising a roll element with a lateral surface, wherein the roll element is of rotationally symmetrical design about an axis of rotation, wherein, along its axial extension, the roll element has, with regard to the lateral surface, different diameters, with a maximum diameter and with a minimum diameter, wherein, with regard to the lateral surface, no diameter of the roll element is greater than the maximum diameter and no diameter of the roll element is smaller than the minimum diameter, wherein the roll element has a first roll region which is arranged at one end of the roll element and in which there is situated a partial region in which the roll element has the maximum diameter, wherein the roll element has a second roll region which is arranged adjacent to the first roll partial region and in which there is situated a partial region in which the roll element has the minimum diameter, wherein the minimum diameter of the roll element in the second roll region is at least 95% and at most 99.8% of the maximum diameter of the roll element in the first roll region. Here, the diameter of the roll element with regard to lateral surface corresponds to the diameter of the lateral surface, such that, with regard to the lateral surface, the minimum diameter of the roll element and the maximum diameter of the roll element thus constitute the minimum diameter and maximum diameter respectively of the rolling support region.

According to the present disclosure, the carrier roller is furthermore configured such that, here, the roll element has a third roll region which is arranged at a further end of the roll element, wherein the further end is arranged opposite the end of the roll element with the first roll region, such that the second roll region is arranged in an axial direction between the first roll region and the third roll region, wherein the rolling support region has the maximum diameter at least in a part of the third roll region. Just like the first roll region and the second roll region, the third roll region constitutes a partial region of the roll element. The third roll region is situated at the other end of the roll element, which on the carrier roller is situated opposite the end with the first roll region, resulting in the sequence "first carrier roller base—first roll region—second roll region—third roll region—second carrier roller base" in the axial direction for this part of the roll element.

Accordingly, in each of its end sections—in the first roll region and in the third roll region—the rolling support region thus has the maximum diameter in each case at one position or at multiple positions, and in the central section—the second roll region—the rolling support region has the minimum diameter at one position or at multiple positions.

It is possible here that the roll element is of symmetrical design in an axial direction, such that a first half of the roll element, in which the first roll region is arranged, is mirror-symmetrical with respect to a second half of the roll element, in which the third roll region is arranged, wherein the mirror plane divides the second roll region centrally and at right angles with respect to the axis of rotation. The mirror plane is accordingly oriented in a radial direction and therefore intersects the axis of rotation at a right angle, such that the roll element on one half of the carrier roller, which has the first carrier roller base, is, when mirrored about said mirror plane, of identical design (mirror-identical) to the roll element on the other half of the carrier roller, which has the second carrier roller base.

It is however instead also possible for the roll element to be of asymmetrical design in the axial direction. Here, it is the case in particular that the first half of the roll element, in which the first roll region is arranged (and which is situated at the first carrier roller base), and the second half of the roll element, in which the third roll region is arranged (and which is situated at the second carrier roller base), have no symmetry with one another in the axial direction (wherein the rotational symmetry self-evidently still also exists). Aside from a completely asymmetrical configuration, this for example also relates to the situation in which a partial mirror plane exists, which is duly arranged at right angles with respect to the axis of rotation but does not intersect the axis of rotation in the center of the axis of rotation in the axial extension, such that the roll element thus exhibits differences between the two sides.

In the above embodiments, the carrier roller may basically be configured such that the diameter of the rolling support region decreases monotonously from a first point, at which the rolling support region has the maximum diameter, to a second point, at which the rolling support region has the minimum diameter. The diameter of the rolling support region is considered to decrease monotonously when the diameter decreases constantly, or remains the same, but does not increase, from the first point (position) to the second point (position) in the progression along the axial direction. For a symmetrical roll element for example, which has the above-described first roll region, second roll region and third roll region, the result is thus, in the simplest case, a roll element with a single waisted formation, for example in the form of two frusta connected to one another by way of the top surfaces (hourglass or diabolo shape).

Irrespective of a symmetrical or asymmetrical configuration in the axial direction, the (rotationally symmetrical) roll element may self-evidently have any suitable shapes. Accordingly, the—two-dimensional—profile of the rolling support region may for example be that of a straight line, of a section of a hyperbola, of a section of a parabola, of a section of a sinusoidal curve, of a section of the inner region of a toroid or of a cutaway torus, or else may have any other regular or irregular geometrical shape.

The carrier roller is typically designed such that the rolling support region of the roll element has the smallest diameter where the conveyor belt is subjected to the highest loading. During straight running, said most highly loaded region is generally situated centrally on the conveyor belt. When the conveyor belt is supported downwardly by a single carrier roller, then this carrier roller arranged below the conveyor belt should therefore be of symmetrical design in the axial direction (and thus transversely with respect to the conveying direction).

In the case of asymmetrical loading of the carrier roller—for example in the case of carrier rollers which are arranged at the edge region of a troughed conveyor belt or at the side of a rolled conveyor belt and which support this to the side (side carrier roller) or in the case of upper carrier rollers of a rolled conveyor belt—it may under some circumstances be more advantageous for the rolling support region of the roll element to be configured such that it has the smallest diameter not in the center of the carrier roller but rather at a point that is offset somewhat laterally, or even at the edge of the carrier roller. For troughed or rolled conveyor belts, particularly low overall running resistance can be realized through simultaneous use of symmetrical carrier rollers and asymmetrical carrier rollers.

According to a further aspect, the carrier roller is configured such that the carrier roller has a single roll ring, the lateral surface of which forms the rolling support region of the roll element. Alternatively, the carrier roller may however also be configured such that the carrier roller is designed as a segmented carrier roller that has at least two roll rings (that is to say more than one roll ring). A roll ring refers to a coherent element which has two roll ring bases with bearing holders and which has a roll segment whose lateral surface forms at least a partial region of the rolling support region of the roll element, wherein, in the case of a segmented carrier roller, the individual roll rings are rotatably mounted on the same axle.

According to a further aspect, the carrier roller is thus configured such that it has a roll element with a rotationally symmetrical rolling support region, wherein the greatest diameter of the rolling support region is situated in both end sections of the roll element and the smallest diameter of the rolling support region is situated in a central section of the roll element, where the rolling support region is designed to provide rolling support for a conveyor belt, wherein the smallest diameter of the rolling support region is at least 95% and at most 99.8% of the greatest diameter of the rolling support region, which leads to even better results. The two end sections are situated at the first roll region and the third roll region of the roll element, and the central section is situated at the second roll region of the roll element.

The invention furthermore comprises a carrier roller station (idler station) having at least one of the abovementioned carrier rollers, wherein the carrier roller station is designed as a carrier roller seat or as a carrier roller garland. A carrier roller station is a carrier roller support element which serves as a carrier roller holder and which supports the conveyor belt on the ground (floor). Typically, a carrier frame has multiple carrier roller stations. Carrier roller stations are support points for the running conveyor belt and thus constituent parts of the carrier frame of the conveying path. Carrier roller stations may be in the form of a rigid frame structure in which the carrier rollers are fixedly suspended. Alternatively, carrier roller stations may also be designed as a movable structure in which the carrier rollers are movably suspended and in which the axles of the individual carrier rollers are arranged so as to be movable relative to one another. As a rigid frame structure, use may be made in particular of a carrier roller seat. As a movable structure, use is typically made of a carrier roller garland, in which the axles of multiple carrier rollers are connected to one another in linearly flexible fashion, for example by means of chains. The carrier roller garland is in this case suspended either fixedly or resiliently (for example via buffer elements such as rubber buffers) in a rigid carrier structure.

The geometry and arrangement of the carrier rollers in a carrier roller station is dependent on the conveyor belt width, the nature of the conveyance and the course of the conveying path. In general, in the upper strand, for example for conveyor belts of flat form and with a straight course of the conveying path and a low loading of the conveyor belt, a single carrier roller per carrier roller station may already suffice, whereas, in the case of a troughed conveyor belt, use is made of at least two carrier rollers in a V-shape, typically three carrier rollers in a U-shape, per support point (wherein, for troughed conveyor belts, use is also made of four, five or even more carrier rollers per support point), and for tubular belts, use is generally made of more than three carrier rollers, typically six carrier rollers, which are arranged in an O-shape. In the lower strand, the empty conveyor belt is generally guided by one continuous carrier roller, by two carrier rollers arranged in a V-shape, or by three carrier rollers arranged in a U-shape; it is infrequently also the case, for example in underground sections where both ore-containing material for conveying is discharged and slag for backfilling is supplied, that use is made of combinations of a rolled upper strand and a rolled lower strand. The arrangement of the carrier rollers is commonly selected so as to result in a belt cross section that allows optimum deposition of the bulk material and reliable conveyance thereof without the conveyor belt being bent too intensely in the transverse direction.

According to a further aspect, the carrier roller station is configured such that the carrier roller station has at least three carrier rollers which are arranged such that the axes of rotation of the at least three carrier rollers lie in a vertical plane or in multiple vertical planes that are parallel to one another, wherein the at least three carrier rollers comprise a first carrier roller, a second carrier roller and a third carrier roller, wherein the first carrier roller is arranged in the carrier roller station such that the axis of rotation is oriented at least substantially horizontally and wherein the axis of rotation of the second carrier roller and the axis of rotation of the third carrier roller are each arranged obliquely with respect to the axis of rotation of the first carrier roller, and wherein the first carrier roller is the symmetrical carrier roller discussed above.

This configuration of the carrier roller station is used for supporting and guiding troughed conveyor belts or rolled conveyor belts (pipe conveyor belts, tubular conveyor belts, closed conveyor belts). The carrier rollers of this carrier roller station are arranged such that their axes of rotation lie in a vertical plane—alternatively also in multiple vertical planes that are oriented parallel to one another. In this way, in the case of a rolling movement of all carrier rollers of this carrier roller station, a movement of the supported conveyor belt is made possible in the same direction. In the case of the axes of rotation being arranged in one plane, a particularly compact carrier roller station is realized, in the case of which the axes of rotation are arranged on a multiply bent or curved line; such an embodiment is conventional for example for carrier roller garlands. In the case of an arrangement of the axes of rotation in multiple planes that are parallel to one another, the carrier rollers can be positioned offset with respect to one another in the conveying direction, such that the axes of rotation thereof do not directly intersect one another. As a result of this offset, it is possible for the carrier rollers to be arranged such that they guide the lower outer sheet in a stable manner over the entire width of the conveyor belt, by virtue of the fact that the rolling support regions of the offset carrier rollers can be lengthened and can thus support the conveyor belt in an overlapping manner in the transverse direction.

Here, the carrier roller station comprises at least three carrier rollers, typically three, four, five or more carrier rollers for troughed conveyor belts in a U-shape or V-shape, typically six or more carrier rollers for rolled conveyor belts in an O-shape. Here, the first carrier roller generally supports the conveyor belt downwardly, such that the first carrier roller has a horizontal or at least substantially horizontal axis of rotation and is arranged below the conveyor belt. "At least substantially horizontal" means that the axis of rotation deviates only insignificantly from the horizontal, that is to say may have a deviation of at most 5° with respect to the horizontal. The second carrier roller and the third carrier roller support the conveyor belt downwardly and additionally also in a lateral direction, such that the axes of rotation of the second carrier roller and of the third carrier roller run obliquely with respect to the horizontal. The second carrier roller and the third carrier roller thus support the lower outer sheet of the conveyor belt also in a lateral direction (wherein the vertical planes in which the axes of rotation of the second carrier roller and of the third carrier roller lie may be arranged offset with respect to the vertical plane in which the axis of rotation of the first carrier roller lies). For troughed conveyor belts, the desired troughed shape is thus realized.

For rolled conveyor belts, it is generally the case that an even number of carrier rollers are provided, which are oriented such that, in addition to the first carrier roller, a further carrier roller also has a horizontal axis of rotation, wherein said further carrier roller is then arranged above the tube that is formed by the rolled conveyor belt. The axes of rotation of the other rollers run in an inclined manner with respect to the horizontal and support the lower outer sheet of the conveyor belt, also in a lateral direction, along the entire circumference of the tube, resulting in the desired rolled shape. Here, the first carrier roller generally supports the conveyor belt downwardly (in a position below the conveyor belt) and is of symmetrical design in an axial direction. Support for the conveyor belt at its lower side by means of the above-described carrier rollers is basically also possible using other arrangements, for example with two carrier rollers arranged in a V-shape, over which the conveyor belt is guided.

According to a further aspect, the carrier roller station is configured such that the second carrier roller and the third carrier roller are each a symmetrical carrier roller of the type described above. In the case of such symmetrical carrier rollers, the rolling support region of the roll element has the smallest diameter in the center of the carrier roller.

According to a further aspect, the carrier roller station is configured such that the second carrier roller and the third carrier roller are each asymmetrical carrier rollers of the type described above, wherein, in the case of the second carrier roller and the third carrier roller, the second roll region is in each case situated in that half of the respective roll element which is arranged adjacent to the first carrier roller. In the case of such asymmetrical carrier rollers, the rolling support region of the roll element does not have the smallest diameter in the center of the carrier roller, said smallest diameter rather being situated so as to be laterally offset with respect to the center, or even at the edge of the carrier roller.

Further configurations of the carrier roller station are furthermore self-evidently also possible, for example configurations in which the lateral carrier rollers comprise both symmetrical carrier rollers and asymmetrical carrier rollers, that is to say for example a carrier roller station in which the second carrier roller is a symmetrical carrier roller of the above-described type and the third carrier roller is an asymmetrical carrier roller of the above-described type.

The invention furthermore comprises a belt conveyor system having at least one of the carrier roller stations described above and having a troughed conveyor belt and/or a rolled conveyor belt. This encompasses a belt conveyor system with a conveyor belt that is guided as a troughed conveyor belt in the upper strand and in the lower strand, a belt conveyor system with a conveyor belt that is guided as a rolled conveyor belt in the upper strand and in the lower strand, a belt conveyor system with a conveyor belt that is guided as a rolled conveyor belt in the upper strand and as a troughed conveyor belt in the lower strand, a belt conveyor system with a conveyor belt that is guided as a troughed conveyor belt in the upper strand and as a rolled conveyor belt in the lower strand, or else a belt conveyor system with a conveyor belt that is guided as a troughed or rolled conveyor belt in the upper strand and as a flat conveyor belt in the lower strand.

Aside from the at least one carrier roller station, the belt conveyor system may have further elements and assemblies that are typically provided in belt conveyor systems, that is to say for example a drive station or multiple drive stations for driving the conveyor belt for the purposes of transporting the material for conveying (on the upper strand) in the conveying direction, including drive motors, diverting stations for diverting the conveyor belt at the start and at the end of the conveying path, dispensing devices for the material for conveying, such as chutes, which serve for dispensing the material for conveying onto the conveyor belt at the starting point of the conveying path, conveyor terminating devices for shedding and discharging the material for conveying at the end point of the conveying path, devices for stripping off the material for conveying, such as plough-type strippers or scrapers, belt cleaning devices such as cleaning brushes, tensioning devices for tensioning the conveyor belt for example by means of tensioning drums, belt turning devices, and the like.

The invention furthermore comprises a method for supporting and guiding a troughed or rolled moving conveyor belt that has a transverse curvature transversely with respect to the movement direction, wherein the conveyor belt is, in the region of the transverse curvature, guided along on at least one of the carrier rollers described above and supported by the rolling support region, in particular when the radius of curvature of the transverse curvature of the conveyor belt is at most 5 m or at most 2 m or even at most 1 m.

During the operation of a belt conveyor system, for the conveyance of the material for conveying, a troughed conveyor belt or a rolled conveyor belt is moved in a conveying direction, that is to say in the longitudinal direction of the conveyor belt and thus at least substantially parallel to the longitudinal members of the conveyor belt. Here, owing to the formation of the trough shape or tube shape, the conveyor belt also has a curvature transversely with respect to the movement direction (conveying direction) of the conveyor belt, the transverse curvature. In the region of the transverse curvature, that is to say where the conveyor belt has such a transverse curvature, the conveyor belt is guided along on at least one of the above-described carrier rollers, typically on multiple carrier rollers, which are arranged in a carrier roller seat. At this location, the conveyor belt is supported in the region of the transverse curvature by the rolling support region of the single carrier roller or by the rolling support regions of the multiple carrier rollers. In particular in the case of troughed or rolled conveyor belts, the transverse curvature is not constant over the entire width of the carrier roller, it rather being the case, specifically in the carrier roller support region, that intensely curved regions (in the corners) and flat regions (carrier roller support) alternate along the belt width. This approach is particularly expedient when the radius of curvature of the transverse curvature of the conveyor belt is relatively small, that is to say for example when the radius of curvature of the transverse curvature of the conveyor belt is at most 5 m or even at most 2 m or only at most 1 m, because at such values particularly intense abrasion would occur when conventional carrier rollers were used, which abrasion can be reduced or even avoided through the use of the carrier rollers designed according to the invention.

According to a further aspect, the method is carried out such that, as the at least one carrier roller, use is made of a carrier roller with a roll element with a rolling support region whose diameters which vary along the axial extension in each case correspond with the transverse curvature of the conveyor belt. The single carrier roller or the multiple carrier rollers then each have a roll element with a rolling support region that at least regionally tapers, and is possibly even formed with a singly or multiply waisted formation, along the axial extension (and thus in the direction of the axis of rotation). It is expedient here the diameters, which vary along the axial extension, of the rolling support region of the roll element of the carrier roller correspond in each case with the (local) transverse curvature of the conveyor belt, that is to say if, over the axial extension of the roll element (and thus over the axial extension of the carrier roller), the diameters of the rolling support region follow the profile, set with the transverse curvature, of the conveyor belt transversely with respect to the conveying direction, and the rolling support region has a more pronounced waisted formation or taper along the axial extension the more intense the transverse curvature is at this location (and thus the smaller the radius of curvature thereof is).

It is pointed out that the carrier rollers illustrated in FIGS. 1 to 5 serve primarily for illustrating the concept according to the invention and are therefore not illustrated true to scale. Here, in particular, the ratio of minimum diameter of the rolling support region to maximum diameter of the rolling support region may deviate from the values that are to be adhered to according to the invention, because the size difference of minimum diameter and maximum diameter of the rolling support region is so small that no difference would be visible in the diagrammatic illustration, for which reason, in these schematic illustrations, merely for illustrative reasons, the size difference has been illustrated on an exaggeratedly large scale and therefore as being greater than that which is admissible according to the invention.

FIG. 1 is a figurative illustration of a carrier roller 10 with a conveyor belt 20 in a side view, which schematically shows the curvature of the conveyor belt 20 in a longitudinal direction. The carrier roller 10 is of rotationally symmetrical design with respect to an axis of rotation 11 and is mounted so as to be rotatable about said axis of rotation 11. Here, the upper side of the carrier roller 10—specifically the outer side of the rolling support region of the roll element of the carrier roller 10—has a diameter (corresponding to twice the radius 52) that varies in an axial direction (not illustrated). The conveyor belt 20 comprises a longitudinal member 21 at the inside and an upper outer sheet 22, on which the material for conveying is situated (not illustrated), and a lower outer sheet 23, which is in contact with the upper side of the carrier roller 10, more specifically with the upper side of the rolling support region of the roll element of the carrier roller 10. During the movement of the conveyor belt 20 in the movement direction 50, said conveyor belt is supported by the carrier roller 10, whereby the carrier roller 10 is set in a rotational movement in the direction of rotation 51 about its axis of rotation 11.

Owing to the loading with material for conveying 26, the conveyor belt 20 sags in the section between two successive carrier rollers 10, with the result that the conveyor belt 20 exhibits a longitudinal curvature. The longitudinal curvature of the conveyor belt 20 can be quantified by the local radius of curvature 53 of the longitudinal member 21 of the conveyor belt 20. Here, the radius of curvature 53 occurs in the center of the contact region in which the lower side of the lower outer sheet 23 is in contact with the upper side of the rolling support region of the roll element of the carrier roller 10. It is now assumed that the distance 54 between the surface (lower side) of the lower outer sheet 23 and the center of the longitudinal member 21 has the result that, owing to the longitudinal curvature, the surface of the lower outer sheet 23 travels at a slightly different speed than the center of the longitudinal member 21. Here, over the width of the carrier roller 10 (along the axial extension of the carrier roller, that is to say perpendicular to the drawing plane of FIG. 1), the speed difference varies owing to an additional transverse curvature of the conveyor belt 20. Since, on the other hand, the carrier roller 10 can rotate only with an angular speed that is constant over the entire width of the carrier roller 10, local stresses arise in the conveyor belt 20 in the contact region. These stresses give rise, owing to friction losses in the contact with the carrier roller 10, to increased running resistance and thus also increased wear of the conveyor belt 20. This effect can be reduced or even eliminated by means of the carrier roller according to the invention.

FIG. 2, FIG. 3.1 and FIG. 3.2 show schematic front views of different configurations of a carrier roller 10, wherein the configuration illustrated in FIG. 3.2 is not covered by the present disclosure. The carrier roller 10 is in each case designed to be rotatable about an axis of rotation 11 and comprises a roll element 12. The roll element 12 is in each case configured so as to have, at least in its central region, a rolling support region 13 which is designed as a lateral surface rotationally symmetrical with respect to the axis of rotation 11 of the carrier roller 10 and which comes into contact with the conveyor belt during operation. As a result, the rolling support region 13 supports the conveyor belt at the lower side thereof and rolls on said lower side (here, the movement direction 50 of the conveyor belt—not illustrated here—runs perpendicular to the plane of the illustration). Furthermore, the roll element 12 is in each case configured such that, at least at one end section thereof, there is provided a region that does not make supporting contact with the conveyor belt during operation.

For the sake of clarity, details relating to the structural configuration of the axis of rotation 11 and of the end-side carrier roller bases, including the respective bearing holders and bearings, are not illustrated in FIG. 2, FIG. 3.1 and FIG. 3.2; for these, use may basically be made of all common variants and connections that are conventional for such elements.

In the variant illustrated in FIG. 2, the rolling support region 13 is limited to the central region, and in the variants illustrated in FIG. 3.1 and FIG. 3.2, the rolling support region 13 extends, in each case on one side of the carrier roller 10, beyond the central region into the local end section of the roll element 12.

Along the axial extension 60 of the rolling support region 13—that is to say in the axial direction—the rolling support region 13 has different diameters, with a maximum diameter 14 and a minimum diameter 15, wherein the minimum diameter 15 of the rolling support region 13 is at least 95% and at most 99.8% of the maximum diameter 14 of the rolling support region 13 (in FIG. 2, FIG. 3.1 and FIG. 3.2). The difference between minimum diameter 15 of the rolling support region 13 and maximum diameter 14 of the rolling support region 13 is thus relatively small and is at most 5% of the maximum diameter 14. The minimum diameter 15 must therefore lie within a relatively narrow size range of 95% to 99.8%, wherein this may be selected to be even narrower. Accordingly, the lower limit of the size range for the minimum diameter 15 may alternatively also be 98.0% or even only 99.0% of the maximum diameter 14, and/or the upper limit of the size range for the minimum diameter 15 may also be 99.75% or even only 99.5% of the maximum diameter 14.

In the variants illustrated in FIG. 2 and FIG. 3.1, the rolling support region 13 has the maximum diameter 14 in each case at both outer edges (FIG. 2 and FIG. 3.1), where the rolling support region 13 transitions into a region that does not make supporting contact with the conveyor belt during operation. In the variants illustrated in said figures, at the end section that does not make supporting contact with the conveyor belt during operation, the diameter of the roll element 12 does not vary in the axial direction but rather remains substantially constant. The diameter of the roll element 12 is therefore identical to the maximum diameter 14 of the rolling support region 13, wherein other configurations may however basically also be possible for the non-supporting region. Accordingly, in the axial direction, said region may for example have a diameter other than the maximum diameter 14 of the rolling support region 13, or else may have different diameters, and may for example taper or widen along the axial extension 60 if, during operation, the conveyor belt does not make contact with the surface of the roll element 12 there. (It is pointed out that, for the sake of clarity, on the roll element 12, the maximum diameter 14 of the rolling support region 13 is shown not in the rolling support region 13 itself but outside the latter, that is to say in the region that does not make supporting contact with the conveyor belt during operation; in the configurations illustrated, the diameter of the roll element 12 is, in the latter region, constant and identical to the maximum diameter 14 of the rolling support region 13, such that the diameter shown duly does not reflect the position, but does reflect the size, of the maximum diameter 14 of the rolling support region 13.)

The carrier rollers 10 illustrated schematically in FIG. 2 and FIG. 3.1 each have, at their left-hand and right-hand end sections, regions which do not make supporting contact with the conveyor belt during operation and the diameters of which in each case correspond to the maximum diameter 14 of the rolling support region 13. Said regions each transition into the rolling support region 13, such that the rolling support region 13 has the maximum diameter 14 in each case both at its left-hand edge and at its right-hand edge, specifically in the end-side first roll region 16 of the roll element 12 and in the end-side third roll region 18 of the roll element 12, which is situated opposite the first roll region 16 in the axial direction. Thus the roll element 12 therefore has the greatest diameter of the rolling support region 13 in its two end sections.

Here, the rolling support region 13 is of symmetrical design as viewed in each case in an axial direction, wherein the minimum diameter 15 of the rolling support region 13 is situated in the central section of the roll element 12, specifically in the center of the rolling support region 13. The minimum diameter 15 of the rolling support region 13 is thus situated in the second roll region 17 of the roll element 12, which region is arranged directly between the first roll region 16 and the third roll region 18 so as to adjoin these. The diameter of the rolling support region 13 decreases continuously from the two edges of the rolling support region 13 to the center of the rolling support region 13, that is to say from the two locations where the rolling support region 13 has in each case the maximum diameter 14 to the location where the rolling support region 13 has the minimum diameter 15, such that the diameter decreases in each case monotonously there.

FIG. 2 illustrates a carrier roller 10 in the case of which the roll element 12 is of symmetrical design in an axial direction. The left-hand side of the roll element 12, which comprises the first roll region 16 and the first half of the second roll region 17, is of mirror-symmetrical design with respect to the right-hand side of the roll element 12, which comprises the third roll region 18 and the second half of the second roll region 17, wherein the mirror plane 61 that separates the left-hand side and the right-hand side of the roll element from one another intersects the roll element 12, at right angles with respect to the axis of rotation 11, centrally in the third roll region 18.

The carrier roller 10 illustrated in FIG. 2 can be used for supporting troughed or rolled conveyor belts, for example in a carrier roller station for troughed or rolled conveyor belts in which all carrier rollers are of identical design, as a lower carrier roller (or lower carrier rollers) in carrier roller stations for troughed or rolled conveyor belts, which lower carrier roller supports the conveyor belt in each case downwardly, or as an upper carrier roller (or upper carrier rollers) in carrier roller stations for rolled conveyor belts.

FIG. 3.1 illustrates a carrier roller 10 in the case of which the roll element 12 is of asymmetrical configuration in an axial direction. The rolling support region 13 of the carrier roller 10 illustrated in FIG. 3.1 is of identical design to the rolling support region 13 of the carrier roller 10 illustrated in FIG. 2. By contrast to the construction shown in FIG. 2, it is however the case in FIG. 3.1 that the rolling support region 13 is arranged not centrally on the roll element 12 but rather is offset toward one end. Thus the left-hand side of the roll element 12, which comprises the first roll region 16 and the first half of the second roll region 17, therefore differs from the right-hand side of the roll element 12, which comprises the third roll region 18 and the second half of the second roll region 17.

The carrier roller 10 illustrated in FIG. 3.1 can be used for supporting troughed or rolled conveyor belts, for example as a lateral carrier roller in carrier roller stations for troughed or rolled conveyor belts, which supports the conveyor belt in each case downwardly.

FIG. 2 and FIG. 3.1 depict carrier rollers 10 which each have a rolling support region 13 that is symmetrical in an axial direction. Overall, the rolling support region 13 may be of any desired (rotationally symmetrical) design. By contrast to the previously illustrated carrier rollers, the carrier roller 10 schematically illustrated in FIG. 3.2 has a region which does not make supporting contact with the conveyor belt during operation, and the diameter of which corresponds to the maximum diameter 14 of the rolling support region 13, only at a single end section—the right-hand end section of said carrier roller accordingly, the configuration illustrated in FIG. 3.2 is not covered by the present disclosure. Said region transitions into the rolling support region 13, such that the rolling support region 13 has the maximum diameter 14 only at its right-hand edge, in the end-side first roll region 16 of the roll element 12. Thus the roll element 12 therefore has the greatest diameter of the rolling support region 13 in its right-hand end section.

As viewed in an axial direction, in the case of the carrier roller 10 illustrated in FIG. 3.2, the rolling support region 13 is of asymmetrical design, wherein the minimum diameter 15 of the rolling support region 13 is situated in the second roll region 17 close to the left-hand edge of the roll element 12 and thus in the end section thereof. Consequently, said carrier roller 10 has only a first roll region 16 and a second roll region 17, which are arranged directly adjacent to one another, but no third roll region. From the right-hand edge of the rolling support region 13, where the rolling support region 13 has the maximum diameter 14, to the location where the rolling support region 13 has the minimum diameter 15, the diameter of the rolling support region 13 decreases continuously, such that the diameter thus decreases monotonously.

The specific configuration of the (rotationally symmetrical) rolling support region 13, and of those regions of the roll element 12 that do not make contact with the conveyor belt during operation, is selected here in each case in accordance with the respective requirements. By contrast to the carrier rollers 10 illustrated in FIG. 2, FIG. 3.1, it is for example also possible for the diameter of the rolling support region 13 to be constant over sections of the rolling support region 13, and the minimum diameter 15 of the rolling support region 13 and the maximum diameter 14 of the rolling support region 13 may exist at more than one location, whereby a resulting contour of the roll element 12 in the axial direction may also be a multiply curved profile.

The carrier rollers 10 illustrated in FIG. 2 and FIG. 3.1 may optionally each have a friction-reducing coating on the lateral surface of the roll element 12, optionally also multiple coatings. Here, typical coatings are a lacquer or a polymer layer that is applied to the entire lateral surface of the roll element 12 or only to a partial region thereof, for example the rolling support region 13 or even only to a part of the rolling support region 13, for example to the edge region of the rolling support region 13. By contrast to the illustration in FIG. 2 and FIG. 3.1, those regions shown therein which, as per FIG. 2 and FIG. 3.1, do not make supporting contact with the conveyor belt during operation may instead also be designed as regions that make supporting contact with the conveyor belt during operation. Thus, said regions would then therefore constitute end-side partial regions of the rolling support region 13, the diameter of which is constant along the axial extension and corresponds to the maximum diameter 14 of the rolling support region 13.

The carrier rollers 10 illustrated here in FIG. 2, FIG. 3.1 and FIG. 3.2 each have single-piece roll elements 12, such that the roll element 12 is formed in each case only from one single tube section (segment), the roll ring. The carrier roller bases are fitted into the ends of said roll ring. Here, the lateral surface of said roll ring forms the rolling support region of the roll element, which during operation makes contact with the lower side of the conveyor belt and thus supports the latter. Alternatively, use may also be made of other designs of the roll element. For example, this may also be composed of multiple—at least two—tube sections (segments) which are each closed off at the end sides by caps with bearing elements fitted therein. Said tube sections are then arranged directly adjacent to one another on a common axis of rotation and can perform rotational movements in each case freely and independently of one another about said axis of rotation. The large number of tube sections then together form the roll element, such that the rolling support region is made up of the shell regions of multiple tube sections that are separated from one another by narrow gaps in which the conveyor belt is in each case not supported during operation and which therefore do not belong to the rolling support region 13. (Within these gap regions, the diameter of the roll element is equal to the rotary axle diameter; since these sections however do not belong to the rolling support region 13, the rotary axle diameter does not constitute the minimum diameter 15 of the rolling support region 13 there). In the case of this configuration as a segmented carrier roller, the sum of the shell regions of all tube sections are thus provided collectively as the shell region of the roll element, such that it may be the case that the maximum diameter of the rolling support region and the minimum diameter of the rolling support region are situated not on the same tube section but on different tube sections.

Figure 4:
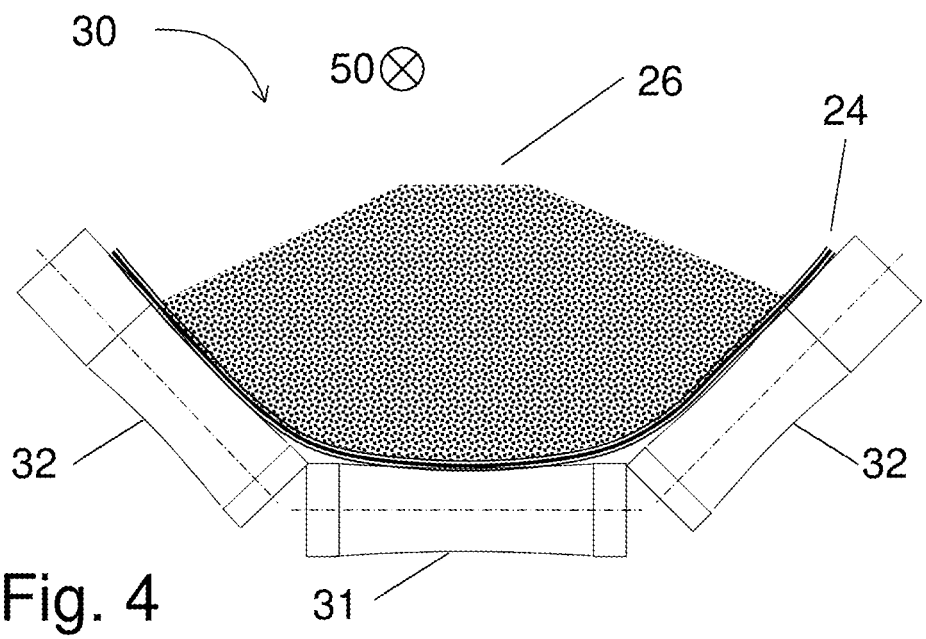
FIG. 4 is a cross-sectional view through a troughed conveyor belt at a carrier roller station.

FIG. 4 schematically shows a cross section of a troughed conveyor belt 24 at a carrier roller station 30, which conveyor belt has an upper outer sheet at its upper side, a longitudinal member at the inside, and a lower outer sheet at its lower side (each indicated in FIG. 4). The troughed conveyor belt 24 is present with a U-shaped trough, into which material for conveying 26 has been introduced. In this illustration, the material for conveying 26 is bulk material, that is to say a granular or lumpy mixture which is present in pourable form; it is self-evidently also possible for all other suitable types of materials to be conveyed instead, for example small piece goods and the like. The carrier roller station 30 has three carrier rollers 31, 32, specifically a lowermost carrier roller 31 with a symmetrical roll element and, for lateral support at the left and at the right, in each case one carrier roller 32 with in each case one asymmetrical roll element. The trough is formed by means of these three carrier rollers and is maintained over the transport path by means of the sequence of carrier roller stations.

At its right-hand and left-hand end sections, the carrier roller 31 arranged at the bottom, which has the symmetrical roll element, has regions which do not make contact with the troughed conveyor belt 24. The troughed conveyor belt 24 is supported there only by the rolling support region in the central section of the carrier roller 31, the diameter of which tapers toward the center of the carrier roller.

In the case of the two carrier rollers 32 each with an asymmetrical roll element, the location at which the rolling support region has the minimum diameter is not situated in the center of the roll element in the axial direction, such that these are roll elements of asymmetrical design. Here, the axes of these two carrier rollers 32 are inclined in relation to the axis of the lower carrier roller 31 with the symmetrical roll element. This inclination results in the U-shape and thus the trough of the troughed conveyor belt 24. The inclined carrier rollers 32 each have, at their lower end sections, a region that does not make contact with the lower side of the troughed conveyor belt 24 and the diameter of which corresponds to the maximum diameter of the rolling support region. At their upper end sections, the inclined carrier rollers 32 likewise have a region whose diameter does not change in the axial direction and corresponds to the maximum diameter of the rolling support region. This region is however in contact with the lower side of the troughed conveyor belt 24, such that the two end-side upper regions therefore belong to the rolling support region against which the upper—partially empty—edge region of the troughed conveyor belt 24 lies. The inclined carrier rollers 32 thus have, at both end-side roll sections, diameters that correspond to the maximum diameter of the rolling support region, wherein but only the region situated at the upper end forms a part of the rolling support region.

As shown in FIG. 4, the three carrier rollers 31, 32 may be arranged in a plane transverse with respect to the movement direction 50 of the conveyor belt. Instead, the three carrier rollers may however also be arranged offset with respect to one another, for example in two mutually parallel planes that are oriented transversely with respect to the movement direction 50 of the conveyor belt, wherein the lower carrier roller 31 lies in one plane and the two inclined carrier rollers 32 lie in the second plane; in this arrangement, it is possible for the rolling support regions of the carrier rollers to overlap below the conveyor belt in a direction transverse with respect to the conveying direction, in order to thus ensure particularly stable and effective support.

Figure 5:
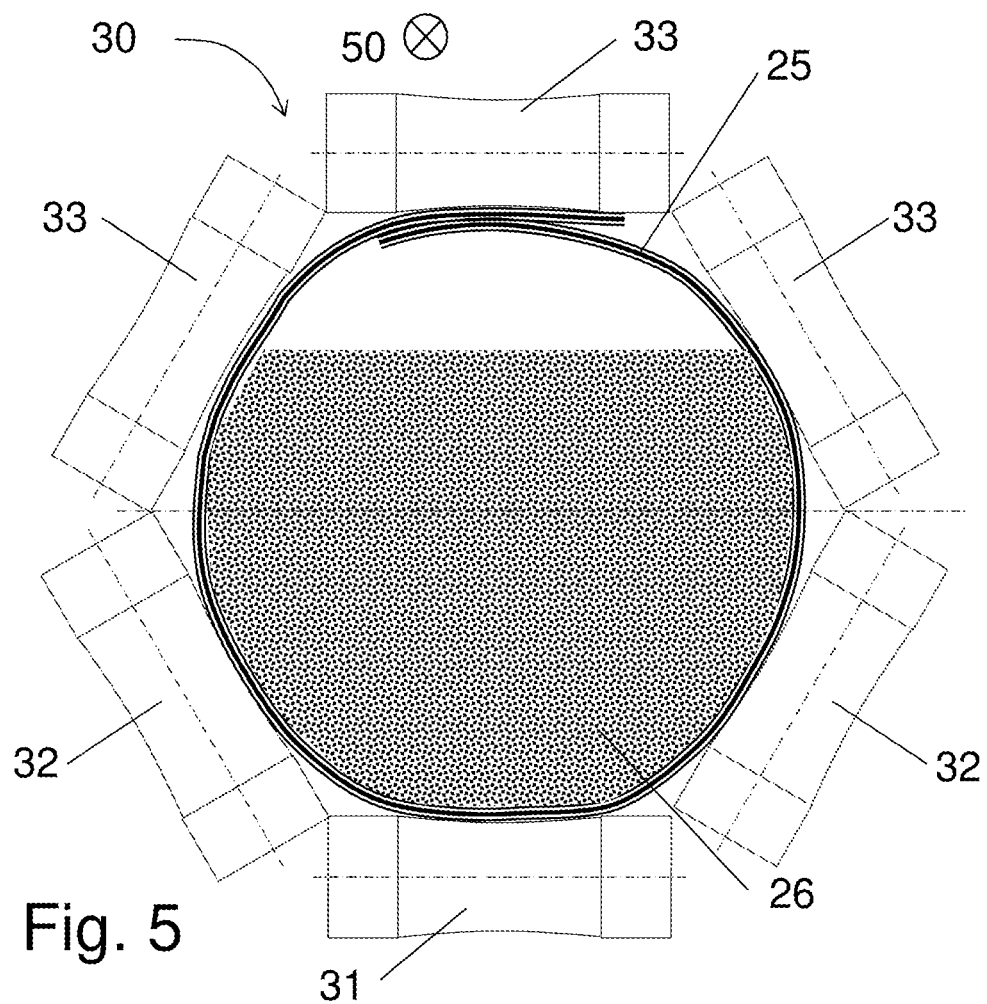
FIG. 5 is a cross-sectional view through a rolled conveyor belt at a carrier roller station.

FIG. 5 schematically shows a cross section through a rolled conveyor belt 25 at a carrier roller station 30, which conveyor belt has an upper outer sheet at its upper side, a longitudinal member at the inside, and a lower outer sheet at its lower side (each indicated in FIG. 5). Here, the rolled conveyor belt 25 forms a tube in which the sides of the rolled conveyor belt 25 have been bent upward to form a O-shape and the end sections in each case overlap at the top and thus form a tubular tube space in which the material for conveying 26 is situated. The carrier roller station 30 has six carrier rollers, specifically a lowermost carrier roller 31 with a symmetrical roll element, in each case one carrier roller 32 with in each case one asymmetrical roll element for lower lateral support to the left and to the right, in each case one carrier roller 33 thereabove with in each case one symmetrical roll element with a narrow rolling support region (which is narrower than the rolling support region of the carrier roller 31 arranged therebelow with symmetrical roll element) for upper lateral support to the left and to the right, and, finally, at the top, a horizontal further carrier roller 33 with a symmetrical roll element with a narrow rolling support region.

Here, the lower carrier roller 31 with the symmetrical roll element and the upper carrier roller 33 with the symmetrical roll element with a narrow rolling support region are situated opposite one another and oriented horizontally, such that the axes of rotation of these elements run horizontally, perpendicularly with respect to the conveying direction. In relation to these horizontally oriented carrier rollers 31, 33, the two carrier rollers 32 for lower lateral support and the two carrier rollers 33 for upper lateral support are each inclined, resulting in the tunnel shape of the rolled conveyor belt 25. Here, in each case one carrier roller 32 provided for lower lateral support is situated opposite one carrier roller 33 provided for upper lateral support, such that the axes of rotation of said carrier rollers run in each case parallel to one another.

All of the carrier rollers 31, 32, 33 respectively have, at their right-hand and left-hand end sections, regions that do not make contact with the rolled conveyor belt 25. Thus, in the carrier roller station 30 illustrated in FIG. 5, the rolled conveyor belt 25 is supported by the rolling support regions in the respective central sections of the individual carrier rollers, wherein the diameter of each rolling support region tapers in each case toward the center thereof. In the case of the two carrier rollers 32 provided for lower lateral support, each of which has an asymmetrical roll element, the location at which the rolling support region has the minimum diameter is not situated in the center of the roll element in an axial direction, such that these are roll elements which are of asymmetrical overall design despite the symmetrical rolling support region. In the case of the two carrier rollers 33 provided for upper lateral support, and in the case of the horizontal carrier roller 33 situated at the top, the location at which the rolling support region has the minimum diameter is situated in the center of the roll element in an axial direction, such that these are roll elements of symmetrical design which each have narrower (smaller) rolling support regions than the lower carrier roller 31. Here, it is thus the case that all carrier rollers 31, 32, 33 have, at the two end-side roll sections, diameters which correspond to the maximum diameter of the rolling support region but which do not make contact with the conveyor belt 25.

The relatively wide rolling support regions are provided for the carrier rollers 31, 32 in the lower half of the rolled conveyor belt 25, because the downwardly acting gravitational force results in a flattening of the rounding of the rolled conveyor belt 25, whereby the contact region between the rolled conveyor belt 25 and the carrier rollers 31, 32 is widened—along with the rolling support region. By contrast, in the upper half of the rolled conveyor belt 25, carrier rollers 33 with relatively narrow rolling support regions are sufficient, because the rolled conveyor belt 25 does not experience any particular flattening there.

It is also the case in the configuration illustrated in FIG. 5 that the axes of rotation of the carrier rollers 31, 32, 33 may be arranged in a single plane transversely with respect to the movement direction 50 of the conveyor belt, or else in multiple mutually parallel planes, that is to say so as to be offset with respect to one another.

For the sake of better clarity, FIG. 4 and FIG. 5 do not illustrate the further constituent parts of the carrier roller station 30 that are typically provided in carrier roller stations, that is to say for example the carrier frame itself, the bearing arrangements of the axles of the carrier rollers on the carrier frame (either rigid, for example in the form of a carrier roller seat, or movable relative to one another, for example in the form of a carrier roller garland), the carrier rollers of the conveyor belt return arrangement in the lower strand, and further optional elements such as lateral guide rollers for limiting an undesired lateral running movement of the conveyor belt during operation, rotary bearings for rotation of the carrier roller station within the conveying plane, chutes and the like.

LIST OF REFERENCE DESIGNATIONS

10 Carrier roller
11 Axis of rotation
12 Roll element
13 Rolling support region
14 Maximum diameter of the rolling support region
15 Minimum diameter of the rolling support region
16 First roll region
17 Second roll region
18 Third roll region
20 Conveyor belt
21 Longitudinal member
22 Upper outer sheet
23 Lower outer sheet
24 Troughed conveyor belt
25 Rolled conveyor belt
26 Material for conveying
30 Carrier roller station
31 Carrier roller with symmetrical roll element
32 Carrier roller with asymmetrical roll element
33 Carrier roller with symmetrical roll element with narrow rolling support region
50 Movement direction of the conveyor belt
51 Direction of rotation of the carrier roller
52 Radius of the rolling support region of the roll element of the carrier roller
53 Local radius of curvature of the longitudinal curvature of the tensile member
54 Distance of the surface of the lower outer sheet to the center of the longitudinal member
60 Axial extension of the rolling support region
61 Mirror plane

What is claimed is:

1. A carrier roller for a conveyor belt that is troughed or rolled, wherein the carrier roller is configured to be rotatable about an axis of rotation, the carrier roller comprising:
 a roll element with a rolling support region that is configured to provide rolling support for the conveyor belt, wherein the rolling support region is rotationally symmetrical with respect to the axis of rotation of the carrier roller and has a diameter that varies along an axial extent, including a maximum diameter and a minimum diameter, with the minimum diameter being at least 95% and at most 99.8% of the maximum diameter, wherein the roll element comprises:
 a first roll region disposed at a first end of the roll element, with at least a part of the first roll region having the maximum diameter, a second roll region adjacent to the first roll region, with at least a part of the second roll region having the minimum diameter, and a third roll region disposed at a second end of the roll element that is opposite the first end, with the second roll region being disposed axially between the first roll region and the third roll region, with at least a part of the third roll region having the maximum diameter.

2. The carrier roller of claim 1 wherein the roll element is symmetrical in an axial direction such that a first half of the roll element in which the first roll region is arranged is mirror-symmetrical with respect to a second half of the roll element in which the third roll region is arranged, wherein a mirror plane divides the second roll region centrally and at right angles with respect to the axis of rotation.

3. The carrier roller of claim 1 wherein the roll element is asymmetrical in an axial direction.

4. The carrier roller of claim 1 wherein the diameter of the rolling support region decreases monotonously from a first point at which the rolling support region has the maximum diameter to a second point at which the rolling support region has the minimum diameter.

5. The carrier roller of claim 1 wherein the minimum diameter is at least 98.0% of the maximum diameter.

6. The carrier roller of claim 1 wherein the minimum diameter is at most 99.75% of the maximum diameter.

7. The carrier roller of claim 1 wherein a lateral surface of a single roll ring forms the rolling support region of the roll element.

8. The carrier roller of claim 1 configured as a segmented carrier roller that has at least two roll rings.

9. The carrier roller of claim 1 wherein the rolling support region at least partially comprises a friction-reducing coating with a polymer or a lacquer.

10. A carrier roller station comprising the carrier roller of claim 1, the carrier roller station being configured as a carrier roller seat or as a carrier roller garland.

11. The carrier roller station of claim 10 wherein the carrier roller is a first carrier roller, the carrier roller station comprising a second carrier roller and a third carrier roller, wherein the first, second, and third carrier rollers are disposed such that axes of rotation of the carrier rollers lie in a vertical plane or vertical planes that are parallel to one another, wherein the first carrier roller is arranged in the carrier roller station such that the axis of rotation is oriented substantially horizontally, wherein the axis of rotation of the second carrier roller and the axis of rotation of the third carrier roller are oblique with respect to the axis of rotation of the first carrier roller, wherein the first carrier roller is symmetrical in an axial direction such that a first half of the first carrier roller is mirror-symmetrical with respect to a second half of the first carrier roller.

12. The carrier roller station of claim 11 wherein each of the second carrier roller and the third carrier roller is symmetrical in an axial direction such that a first half is mirror-symmetrical with respect to a second half.

13. The carrier roller station of claim 11 wherein each of the second carrier roller and the third carrier roller is asymmetrical in an axial direction.

14. The carrier roller station of claim 13 wherein a second roll region of each of the second and third carrier rollers is arranged such that half of the carrier roller is arranged adjacent to the first carrier roller.

15. A belt conveyor system comprising the carrier roller station of claim 10, wherein a conveyor belt of the belt conveyor system is at least one of troughed or rolled.

16. A method for supporting and guiding a conveyor belt that is troughed or rolled and that has a transverse curvature transversely with respect to a movement direction, the method comprising:

guiding in a region of the transverse curvature the conveyor belt along on the carrier roller of claim 1; and supporting in the region of the transverse curvature the conveyor belt with the rolling support region.

17. The method of claim 16, wherein the conveyor belt is guided and supported as recited in claim at one or more locations along a length of the conveyor belt where a radius of curvature of the transverse curvature of the conveyor belt is at most 5 meters.

18. The method of claim 16, wherein the conveyor belt is guided and supported as recited in claim at one or more locations along a length of the conveyor belt where a radius of curvature of the transverse curvature of the conveyor belt is at most 2 meters.

19. The method of claim 16 comprising guiding and supporting the conveyor belt with a plurality of the carrier rollers recited in claim 11, wherein a degree to which the diameter of each rolling support region varies axially corresponds to respective degrees of transverse curvature along the conveyor belt.

* * * * *